Jan. 17, 1956  J. B. CAROLUS  2,731,626
IMPULSE TELEMETERING SYSTEMS
Filed July 1, 1950  3 Sheets-Sheet 1

INVENTOR.
JAMES B. CAROLUS
BY
Woodcock and Phelan
ATTORNEYS

Jan. 17, 1956  J. B. CAROLUS  2,731,626
IMPULSE TELEMETERING SYSTEMS
Filed July 1, 1950  3 Sheets-Sheet 2
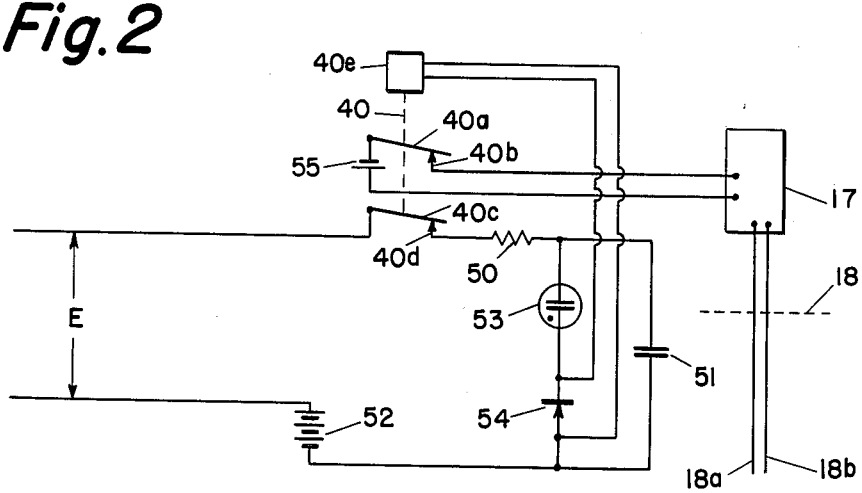
Fig.2
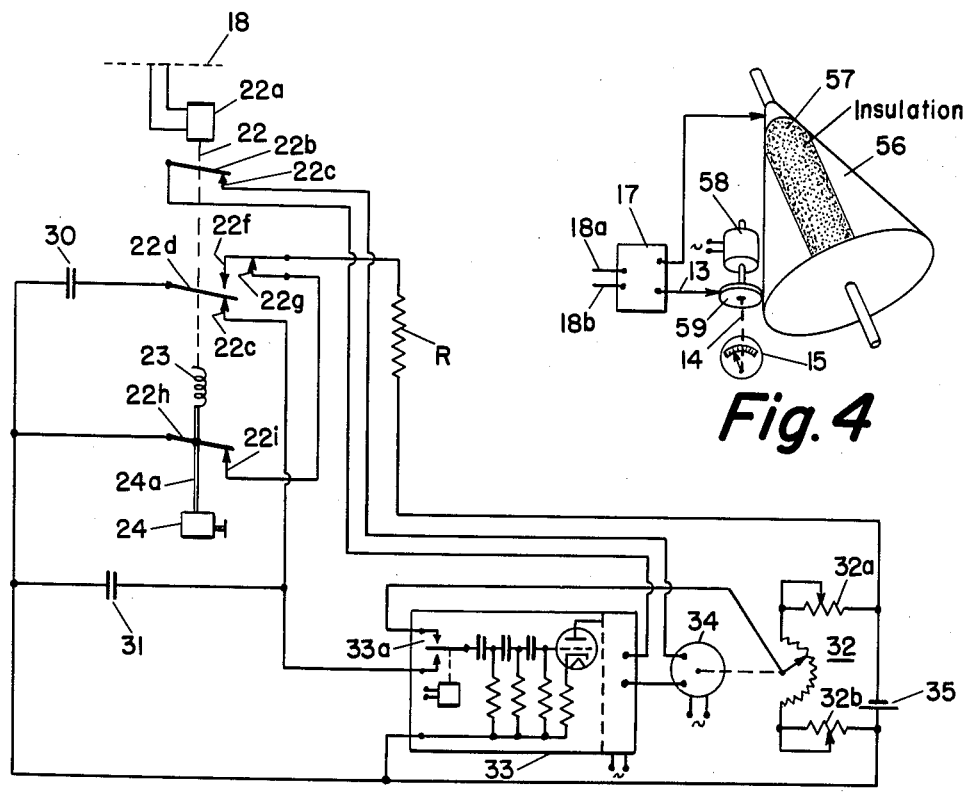
Fig.3
Fig.4
INVENTOR.
JAMES B. CAROLUS
BY
Woodward Chelan
ATTORNEYS

INVENTOR.
JAMES B. CAROLUS

# United States Patent Office 2,731,626
Patented Jan. 17, 1956

2,731,626
IMPULSE TELEMETERING SYSTEMS

James B. Carolus, Elkins Park, Pa., assignor to Leeds and Northrup Company, Philadelphia, Pa., a corporation of Pennsylvania Application July 1, 1950, Serial No. 171,735

16 Claims. (Cl. 340—206)

This invention relates to systems for electrically indicating, recording or reproducing physical, electrical or mechanical magnitudes or conditions, or other magnitudes or conditions including departures or displacement of devices in general, and relates more particularly to telemetric systems of the type in which electrical impulses are produced whose durations are related to the aforesaid conditions or magnitudes which may be transmitted to receiving stations.

More particularly, the present invention is an improvement upon telemetric systems of the type disclosed in Phillips et al. Patent 2,441,226, and has for an object the provision of a system in which the time space between the impulses of variable duration may be uniform and preferably relatively short and in which it is unnecessary to provide synchronization between the transmitter and the receiver.

While the system disclosed in said Phillips et al. patent has gone into extended commercial use and has been successful in its applications, something was left to be desired in that in the system of that patent the time interval between the electrical impulses is always complementary to the duration of the electrical impulses. Accordingly, if the electrical impulses are of short duration, the time intervals are long, the duration time of a pulse plus a space being constant.

In accordance with the present invention, the time intervals need not be complementary to the duration time of the electrical impulses and their sum may vary with change in length or duration of successive impulses.

Further in accordance with the present invention, there is maintained at the input of the measuring circuit a voltage or potential difference corresponding with that produced by the preceding electrical impulse which is modified if a succeeding impulse produces a voltage of different magnitude.

In carrying out the invention in a preferred form thereof, there is provided at the receiving station a network including electrostatic storage means such as a receiving capacitor which is charged to a voltage dependent upon the duration of the electrical impulse received from a remotely located transmitter. The receiving capacitor is then connected to another electrostatic storage means such as a storage capacitor with which it shares its charge. Thus, there is maintained on the input circuit of the measuring system at the receiving station a potential difference, that of the storage capacitor, corresponding in magnitude with the length of the received electrical impulse and which is maintained thereon until the receiving capacitor is again charged and connected to the storage capacitor. Suitable circuit-controlling means, such as one or more relays, operate cyclically, first, to discharge the receiving capacitor; second, to connect it to a local charging circuit to receive a charge of magnitude corresponding with the length of the received electrical impulse; third, to connect the receiving capacitor to the storage capacitor; and, fourth, to repeat the foregoing sequence for subsequent electrical impulses. By reason of the provision of circuit-controlling means operable in response to the received pulses, the time-space between pulses may be short and only long enough to permit operation of the circuit-controlling means between an energized position and a deenergized position, at least one circuit having a time-delay both for opening and closing thereof. The electrical pulse will have a length or duration representative of the then existing magnitude of a condition.

For a more detailed explanation of the invention and for further objects and advantages thereof, reference is to be had to the following detailed description taken in conjunction with the accompanying drawings in which:

Fig. 1 diagrammatically illustrates a wiring diagram embodying the invention;

Fig. 2 is a wiring diagram diagrammatically illustrating a different form of transmitter which may be utilized in substitution for the transmitter disclosed in Fig. 1;

Fig. 3 is a wiring diagram diagrammatically illustrating a different form of receiver which may be utilized in substitution for the receiver disclosed in Fig. 1; and Figs. 4 and 5 illustrate additional transmitters embodying the invention.

Figure 1:
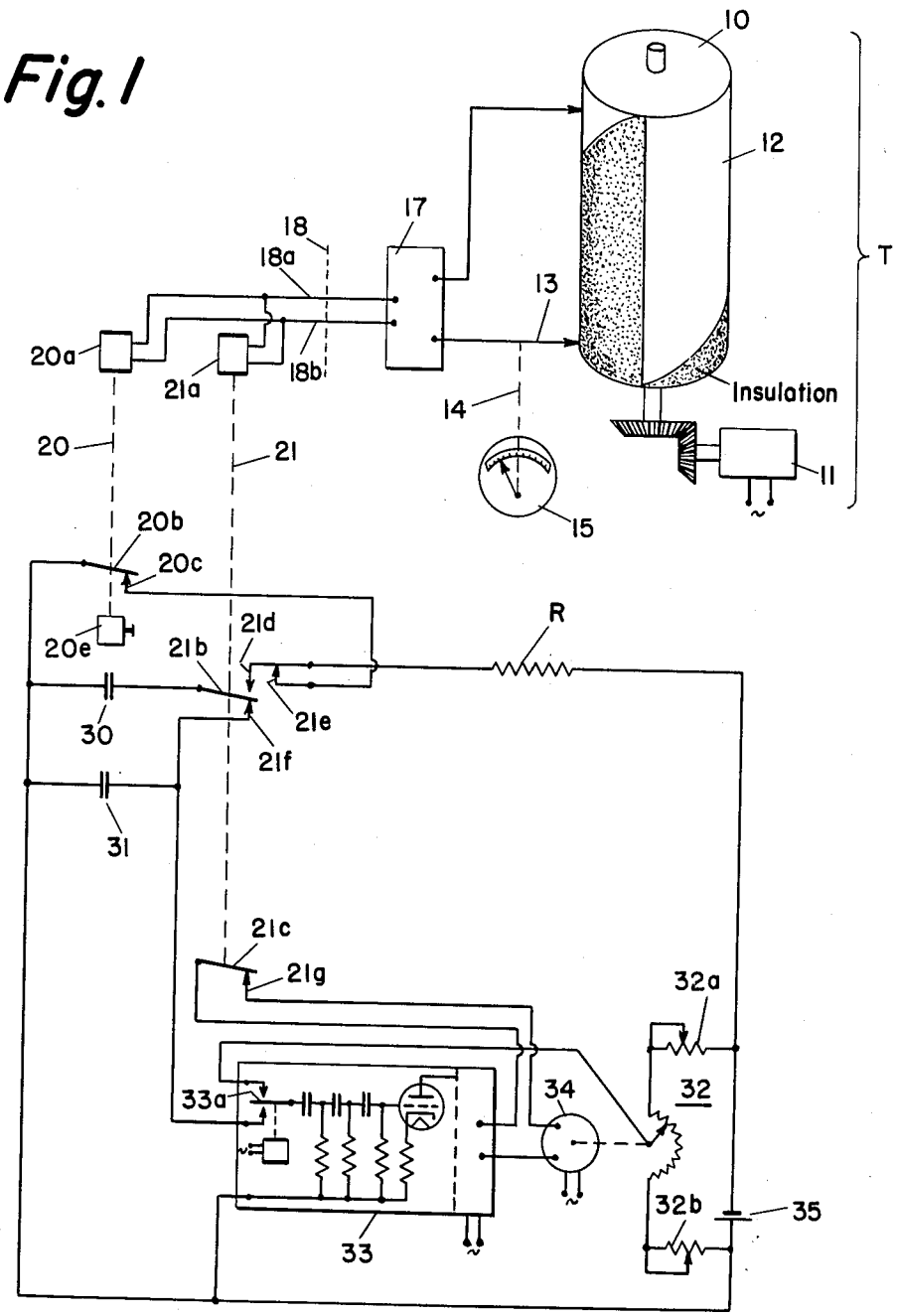

Referring to the drawing, the invention in one form has been illustrated as applied to a telemetric system including a transmitter T provided with a circuit-interrupting or modulating device of any type suited to produce a series of signals whose lengths are determined by or which vary with a function of the magnitude of a condition, for example, pressure, rate of flow, voltage, current or watts. While the circuit-interrupting device need not be of the type illustrated in Fig. 1, the one shown is satisfactory and briefly consists of a cylinder 10 of insulating material which is rotated at constant speed as by a motor 11. The cylinder 10 is provided with a conducting surface or contact 12 so shaped that the fraction of a revolution during which it engages a cooperating contact 13 depends upon the position of the latter axially of the cylinder 10. The contact 13 is suitably coupled, for example, mechanically as indicated by the broken line 14 to an instrument 15 responsive to the magnitude of the condition which is to be transmitted to the receiving stations. The instrument 15 may be of the type disclosed in Squibb Patent 1,935,732.

Due to the shape of the surface of conducting segment 12 illustrated as a spiral, the contact 13 as it moves upwardly, remains in contact with the conducting segment 12 during progressively longer intervals. The time-interval during which contact 13 is in contact with the insulating cylinder 10, the shaded portion, is complementary to the time the contact 13 engages conducting segment 12.

The additional circuit elements at the transmitter for production of the aforesaid signals are conventional and are generically indicated by the box 17, details of which may be as illustrated and fully described in Doyle Patent 2,336,929. Any conventional radio-link or transmission line also may be used to convey the signal pulses to the receiving station. At the receiving station, located to the left of the broken line 18, the electrical impulses are applied to the operating coils 20a and 21a of relays 20 and 21. These relays are sufficiently sensitive to be energized by a pulse of minimum duration, suitable amplifying means for the pulses being provided if desired. As a pulse is received by coils 20a and 21a, both relays are energized simultaneously. Relay 20 is designed to lag behind relay 21 when energized and deenergized, a fixed time-delay being introduced by an suitable means such as by the action of dash pot 20e.

Relay 21, upon energization by an applied pulse, lifts contacts 21b and 21c immediately; contact 21b when partly elevated strikes contact 21d, thereby completing a circuit for shorting capacitor 30 to remove its charge. The shorting circuit can be traced from one side of capacitor 30 through contacts 21b, 21d, 21e, 20c and 20b back to the other side of capacitor 30. Upon further movement of contact 21b, contact 21d is elevated so as to break the circuit connection to contact 21e, whereupon the capacitor 30 with zero charge is then connected to a charging circuit, receiving current from a voltage source, shown as a battery 35, through resistor R. The resistor controls the charging rate of capacitor 30 and also limits the current flow from battery 35 and prevents injury thereto due to said short-circuit connection. The rise of voltage upon capacitor 30 during its charging cycle will depend upon the duration of a pulse which governs the length of time contact 21b is kept engaged with contact 21d. The time-delay of relay 20 is such that it actuates its contact 20b after contact 21b has lifted contact 21d to break its connection with contact 21e to initiate the charging of capacitor 30.

At the end of the pulse from transmitter T, the operating coils 20a and 21a of both relays will be deenergized. Relay 20 is delayed in its response by dash pot 20e, being retained in the elevated or energized position for a short interval sufficient for the operation of relay 21 to the deenergized position shown in Fig. 1. As contact 21b drops, contact 21d moves downwardly again to engage contact 21e but contact 21b continues its motion until disengaged from contact 21d and until it again makes contact with contact 21f. There is now completed a transfer circuit since capacitor 30 is now connected across capacitor 31. The capacitors share their charges. Meanwhile contact 21c has been returned to connection with contact 21g to complete the energizing circuit of motor 34.

If any inequality exists between the voltage appearing upon capacitor 31 and that of capacitor 30, the sharing of their charges will change the voltage or potential difference across capacitor 31. That changed potential difference is impressed upon the input circuit of a suitable electrical instrument 33.

Though the instrument may be of the type disclosed in Patent 1,935,732 issued to Lloyd Y. Squibb, a suitable instrument of the type disclosed in Williams Patents 2,113,164 and 2,367,746 has been diagrammatically illustrated in Fig. 1. By means of a vibrator 33a, the input circuit of the instrument 33 is intermittently connected to receive the voltage across the capacitor 31 for comparison with that developed across a part of the variable resistor of the potentiometer 32 which is adjusted by the motor 34, these several components all forming an integral part of the electrical measuring instrument. Thus, if the result of the comparison of the potential difference across capacitor 31 and that developed by the slidewire of potentiometer 32 produces an input signal to the input circuit of the instrument 33, output energy is developed for the motor 34 which is then energized to drive the slidewire of the potentiometer 32 in a direction to reduce the voltage unbalance. The voltage range of the slidewire is determined by the adjustments of resistors 32a and 32b. The gain of the amplifier of instrument 33 and the operation is such that the voltage developed by the slidewire of potentiometer 32 is maintained closely equal to the potential difference across capacitor 31.

Though not necessary, the contacts 21c and 21g have been provided to interrupt the circuit to the motor 34 during the intervals the capacitor 30 is being discharged and connected in circuit under the control of the impulse received by relays 20 and 21. With capacitor 31 continuously connected across the input circuit of the instrument 33, the potential difference applied thereto will be maintained substantially constant and there will not be an abrupt change of signal at the input circuit which would otherwise result upon the opening of the input circuit as at contact 21f. Thus, in the absence of capacitor 31, contacts 21c and 21g are highly desirable, if not necessary, but with capacitor 31 in circuit as shown, the inclusion of contacts 21c and 21g is not essential and purely optional. Thus, either with or without capacitor 31 there is avoided or greatly minimized the possibility of any spurious signals affecting the instrument 33.

During the time that relay 21 has moved from its energized position to the deenergized position shown in Fig. 1, the relay 20 has been retained in its energized position by action of the time-delay means or dash pot 20e. The delayed response of relay 20 maintains an open circuit between contacts 20b and 20c to prevent the shorting of capacitor 30 during the closure of the circuit between contacts 21d and 21e and permits the movement of contact 21b out of engagement with contact 21d and into engagement with contact 21f to connect capacitor 30 to capacitor 31 without change in potential thereof due to the switching operations. Thus, it will be seen that the movement of relay 20 upon energization need only be delayed for that short interval that contact 21b engages contact 21d before opening the circuit at contact 21e, this being the short time interval of short-circuiting of capacitor 30. Similarly, the delay of movement upon deenergization of relay 20 need only be of such duration as to permit contact 21b to open the circuit at contact 21d to prevent short-circuiting of capacitor 30 during the transfer-switching operation for capacitor 30 to share its charge with capacitor 31.

One cycle of operation has now been described and it is to be observed that the circuit components will remain as illustrated in Fig. 1 until the next pulse from transmitter T is received by relay coils 20a and 21a, at which time there is initiated a further cycle of operations corresponding in sequence of operations with the ones just described. Briefly, at the beginning of the next pulse the relay 21 immediately opens the electrical circuit of the motor 34, disconnects capacitor 30 from capacitor 31, shorts capacitor 30 for a short interval and then connects capacitor 30 in circuit with resistor R and the voltage source 35 to initiate another charging cycle. It is to be observed that the source 35 is common to the capacitor 30 and to the potentiometer circuit 32, thus avoiding errors which would otherwise arise should the potential of separate sources vary during the telemetric operation of the system.

After the initiation of the second charging cycle, the relay 20 disengages its contact 20b from contact 20c preparatory to delayed closure thereof after deenergization of relays 20 and 21. At the termination of the electrical impulse applied to the coils 20a and 21a of relays 20 and 21, the length of said pulse corresponding with the magnitude of the condition at the transmitter, the relays are, of course, deenergized. The relay 21 again closes the motor-energizing circuit, connects capacitor 30 to capacitor 31, the sharing of the charges thereof producing a changed potential difference across capacitor 31 if the second impulse has differed in length with the preceding one, the measuring instrument responding to any change which occurred in that potential difference.

The delayed return to their closed position of relay contacts 20b and 20c prevents the short-circuiting of capacitor 30 during the transfer operations, and after those transfer operations have been completed again closes its contacts preparatory to the short-circuiting operation initiated by the next pulse received at operating coils 20a and 21a.

While the transmitter T has been shown and described as comprising a cylinder rotated at constant speed, thus providing cycles of equal duration, each cycle comprising the sum of the length of the electrical impulse and the time space between that impulse and the succeeding impulse, mention has heretofore been made that the present invention permits the use of a transmitter in which the time space between impulses need not be complementary to that of the length of the electrical impulse. More particularly, a transmitter of the type shown in Fig. 2 may be utilized. In Fig. 2 there has been illustrated a voltage E, representative of the condition to be measured, which is shown as applied to a series-circuit including relay contacts 40c, 40d of relay 40, resistor 50, capacitor 51, and a voltage source 52. A gas tube 53 in series with relay-operating coil 40e is connected in shunt across capacitor 51. The relay-operating coil 40e is in turn shunted by a unidirectional conductive device 54 so polarized in the circuit as to oppose current flow from voltage source 52 and current flow from the voltage E, of like polarity.

The gas tube 53 may be a neon tube or other gaseous conducting device which has a critical voltage-breakdown value. The unidirectional device 54 may be a diode or a crystal rectifier either of the copper oxide or selenium type. The contacts 40a and 40b of relay 40 control the length of electrical impulses derived from battery 55 and applied either directly to the transmission line or to any conventional transmitting system, such as indicated by the box 17.

With the components as described, the transmitter formed thereby is adapted to produce electrical impulses of length corresponding with the magnitude of the voltage E with short-time spaces therebetween which are not complementary with or related to the length of successive impulses. The transmitter has a cyclical operation. For ease in explanation, it will be assumed that the parts have just been moved to their illustrated positions corresponding with the beginning of an electrical impulse transmitted by way of conductors 18a and 18b to any suitable receiver such as the type illustrated in Figs. 1 and 3. The sum of the voltage E and that of battery 52 is applied through contacts 40c and 40d and resistor 50 to the capacitor 51, the potential of which rises. When the potential of capacitor 51 is equal to the ignition voltage of gas tube 53, a discharge circuit for the capacitor 51 is completed by way of operating coil 40e of relay 40. Relay 40 is then energized immediately to interrupt the circuits through its contacts 40a and 40c, the opening of the former marking the end of the timed pulse applied to box 17 and to conductors 18a and 18b. The discharge of capacitor 51 builds up a fairly large current through operating coil 40e with a corresponding loss of voltage. The capacitor 51 continues to discharge until gas tube 53 is extinguished. However, the current flow through the coil 40e does not immediately drop to zero by reason of the fact that the decaying magnetic field cutting the turns of coil 40e tends to maintain the current flow through the path including rectifier 54 and thus provides a time-delayed deenergization of relay 40. After a short time interval, relay 40 again returns to the deenergized position illustrated in Fig. 2 to initiate a second pulse to be transmitted over conductors 18a and 18b to the receiving station, and at the same time again applies the voltage E to the timing circuit. The time duration of the next, or succeeding, pulse will differ from the first pulse if there has been a change in the value of voltage E. The length of each pulse is determined by the value of voltage E and the RC constant of the network including resistor 50 and capacitor 51. As voltage E increases in value, the pulse duration will decrease, inasmuch as the capacitor 51 will be charged to the breakdown or ignition voltage of gas tube 53 in progressively shorter time intervals as voltage E is progressively higher. More particularly, as voltage E increases, the current in the charging circuit of capacitor 51 increases, and, hence, it acquires its charge and the potential difference thereacross rises more rapidly. Thus, gas tube 53 will become conductive as soon as its ignition voltage is again attained by capacitor 51 and relay 40 will be energized to interrupt the second pulse at a time interval earlier than it interrupted the preceding pulse. Conversely, if voltage E decreases from its preceding value, the succeeding pulse will be longer than before. However, the time space between the successive pulses will be approximately the same, since the relay coil 40e is energized to terminate each impulse by voltages equal in magnitude as determined by the ignition voltage of gas tube 53 and unaffected by the length of the electrical impulses transmitted. The source 52 need not be provided in those cases where the minimum value of voltage E is at least equal to and preferably slightly in excess of the breakdown or ignition voltage of gas tube 53. For example, a high voltage slidewire or potentiometer may be provided as the source E, the slidewire being adjusted by a suitable measuring instrument such as shown in said Squibb patent. However, for voltages E of magnitude less than the ignition value of tube 53, the battery 52 is included to raise the sum of the two voltages to above the ignition value.

With the above understanding of the principles of the invention, it is to be understood that certain features thereof may be utilized without other features thereof, and that modifications may be made therein within the scope of the appended claims. For example, while in Fig. 1 two relays 20 and 21 have been illustrated to perform the circuit-changing functions needed, only one relay or other forms of circuit-controlling devices may be utilized.

As shown in Fig. 3, a single relay has been illustrated to perform the circuit-changing functions of both of the relays 20 and 21 of Fig. 1. The single relay 22 is provided with an extra movable contact 22h corresponding with contact 20b of Fig. 1. It cooperates with an associated stationary contact 22i to perform similar functions as the corresponding contacts 20b and 20c of Fig. 1. Thus, upon energization of relay operating coil 22a, contact 22d corresponding with contact 21b of relay 21 short-circuits capacitor 30 through a circuit including contacts 22f, 22g, 22i and 22h. A short time after opening of the circuit between contacts 22f and 22g, the shorting circuit is further opened by contact 22h whose movement has been delayed by the dash pot 24, a spring 23 being provided for the delayed operation of contact 22h. By providing a time-delay dash pot or other suitable device, a rigid connection 24a may be provided between contact 22h and the piston of dash pot 24 to delay also the closing movement of contact 22h until contact 22d has disconnected from contact 22f.

In order to take advantage of the fact that the receiver does not require fixed time intervals for the sum of the electrical impulses and the time-space therebetween, the transmitter of Fig. 4 may be utilized, wherein the time-space between impulses is relatively short and not complementary to the length of the impulses representing the magnitude of the condition under measurement. More particularly, a conical member 56 of electrically conductive material has applied to one face thereof a strip 57 of insulating material of constant width. The conical member 56 is supported in suitable bearings, not shown, for rotation under the influence of a synchronous motor 58 driving a disk 59 which performs the dual function of completing a connection between contact 13 and the conductive conical member 56 as well as to drive the same. The synchronous motor 58 of small size and the disk 59 are mounted for adjustment along the inclined surface of member 56 by the measuring instrument 15. Such adjustment is effected by the measuring instrument 15 which, as earlier described, may include a mechanical relay which provides adequate power for movement of the assembly relative to the conical member 56. The effect of the relative adjustment between driving disk 59 and conical member 56 is to change the speed of the latter and to change the length of the electrical impulse applied to the box 17 representing a transmitter having its own source of electrical supply. With the dual adjustment effected, the time-space between successive impulses remains constant, though the length of successive impulses and the impulse-recurrence-rate vary in accordance with change in the magnitude of the condition and with the positioning of the driving disk 59 from one end of the conical member 56 to the other.

It has been earlier emphasized that the provision of the capacitor 31 across the input circuit of the measuring instrument 33 maintains substantially constant thereacross a potential difference representative of the preceding impulse transmitted to the receiver. Thus, if a succession of pulses were of equal length, there would be no change, or at most, a negligible change, of the potential difference across capacitor 31. Accordingly, in accordance with the invention, it is only necessary that electrical impulses be transmitted to the receiver upon change in the magnitude of a condition.

Figure 5:
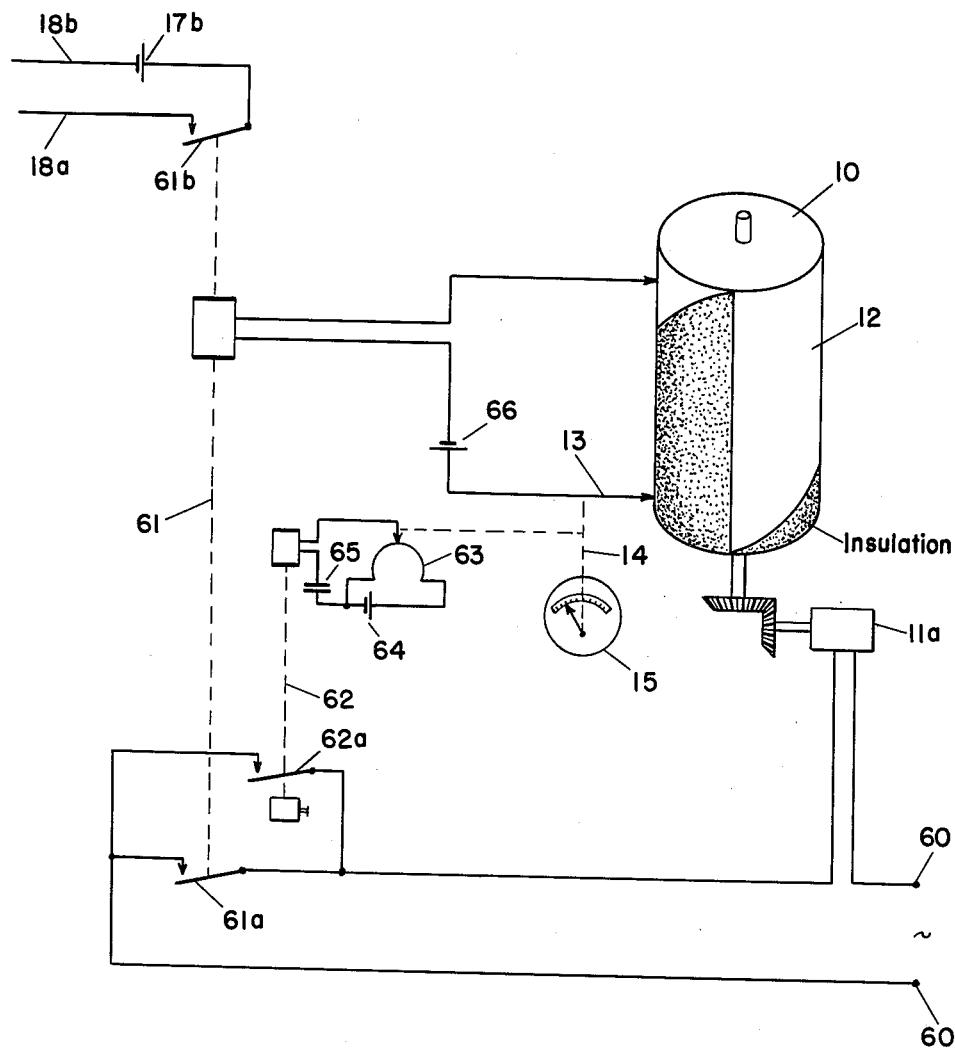

Referring now to Fig. 5, a transmitter has been shown as comprising a cylinder 10 constructed as in the embodiment of Fig. 1 but driven by a synchronous motor 11a energized from a suitable alternating current source of supply indicated by supply terminals 60. The motor 11a is only energized upon change in the magnitude of a condition, as determined by the measuring instrument 15, also of the same type described in connection with Fig. 1. Thus, with the parts in the position shown in the drawings, it will be seen that the motor circuit is incomplete, contacts 61a of contactor 61 and 62a of relay 62 both being in the open position. However, upon change in the magnitude of the condition under measurement, the movable contact 13 is axially adjusted and at the same time there is relative adjustment between a slidewire 63 and its associated contact to produce from battery 64 through capacitor 65 a pulse or flow of current through the operating coil of relay 62 which closes without time-delay but which is provided with a dash pot for slow or delayed opening. Thus, the energizing circuit for the motor 11a is completed and the drum or cylinder 10 is then rotated to complete an electrical circuit from battery 66 for the operating coil of contactor 61 which closes contacts 61b to transmit to a suitable receiver such as disclosed in Fig. 1 or Fig. 3 an impulse whose duration is representative of the magnitude of the condition under measurement. The contactor 61 in closing its contacts 61a completes a holding circuit for the motor 11a for reasons which will be hereinafter explained.

The dash pot or time-delay opening means of relay 62 is utilized for purposes which will be apparent from an inspection of Fig. 5. If counterclockwise rotation of cylinder 10 be assumed, it will be necessary for the cylinder 10 to be rotated until the conducting element 12 is moved beneath contact 13 for energization of contactor 61. By providing a delay in the opening movement of relay 62, adequate for the maximum movement of insulation beneath contact 13, assurance is always had that contacts 62a will keep the motor circuit closed until contact 13 engages conductive element 12 after which contacts 61a may also serve to keep the motor circuit closed. When contactor 61 is energized, contacts 61b initiate and maintain a pulse over conductors 18a and 18b by completing the circuit from the transmitter source shown as a battery 17b.

Further in accordance with the invention, the dash pot of relay 62 may be adjusted for one, two or more selected revolutions of the cylinder 10 for the successive transmission of any desired number of impulses.

The termination of an impulse, as by movement of contact 13 upon a part of the insulation of cylinder 10, the magnitude of the condition then being at a constant value, produces deenergization of the operating coil of contactor 61. If relay 62 has opened contacts 62a, the motor 11a will come to rest with contact 13 on the insulated portion of cylinder 10. The system will then be in readiness to respond to a change in the magnitude of the condition and will then function through another cycle in the manner described above to produce a second impulse by way of pulse transmitter 17 of length corresponding with the new magnitude of the condition. However, until there is a change which produces energization of relay 62, the transmitter will remain at rest. During that period, the transmission lines 18a and 18b may be utilized for other purposes such as communication, if desired. Thus, both at the transmitter and the receiver there is avoided operation until there has been a change in the magnitude of the condition.

In the event that relay 62 moves to its open position during the transmission of a pulse, contact 13 then being in engagement with the conductive section 12 of cylinder 10, the operating coil of contactor 61 will continue to be energized and motor 11a will continue in operation until the circuit of the operating coil is interrupted by movement of insulation of cylinder 10 beneath contact 13. Thus, there is assurance of the completion of any pulse, once initiated, and there is also assurance under all conditions that cylinder 10 will always come to rest with the energizing circuit of the operating coil of contactor 61 open as by movement of the insulated section of transmitter 10 beneath contact 13.

While preferred embodiments of the invention have been disclosed, it will be obvious to those skilled in the art that additional modifications may be made within the spirit and scope of the appended claims.

What is claimed is:

1. In an impulse telemetering system, a receiver comprising a capacitor, means for charging said capacitor at a controlled rate, an electrical instrument in circuit with a potential difference of known magnitude and including means for adjusting said potential difference to equal to the voltage acquired by said capacitor and applied to said instrument, and relay-actuated means operable solely in response to and under the control of telemetering impulses for discharging said capacitor and for connecting said capacitor to said charging means for a period representative of the length of a telemetering impulse, thereby to produce a voltage on said capacitor representative of the length of said telemetering impulse, for disconnecting said capacitor from said charging means and for connecting said capacitor to said electrical instrument in series with said adjustable potential difference.

2. In a telemetering system, a receiver of electrical impulses of variable duration, comprising a circuit-controlling means operable from one circuit-controlling position to another solely in response to initiation and termination of an electrical impulse, an electrical instrument having an input circuit, electrostatic storage means operable under the control of said circuit-controlling means for acquiring a voltage representative of the duration of one of said electrical impulses for application to the input circuit of said electrical instrument under the control of said circuit-controlling means for measurement of the magnitude of a condition represented by the length of said electrical impulse.

3. A receiver for a telemetric system comprising a measuring instrument, a capacitor, a source of voltage therefor, and circuit-controlling means operable between a first circuit-controlling position and a second circuit-controlling position in response respectively to and solely by the initiation and termination of an applied electrical impulse, operation of said means from one to the other of its positions first discharging said capacitor, and thereafter connecting it to said source of voltage to acquire a charge related to the length of said applied electrical impulse, said means upon return to its preceding position applying the acquired charge of said capacitor to said measuring instrument.

4. A receiver for a telemetric system comprising a capacitor, a source of voltage therefor, a measuring instrument including a motor, control contacts for said motor, and circuit-controlling means operable from a first circuit-controlling position to a second circuit-controlling position in response respectively to the initiation and termination of an applied electrical impulse, operation of said means from one to the other of its positions opening said motor control contacts and discharging said capacitor, and thereafter connecting said capacitor to said source of voltage to acquire a charge related to the length of said applied electrical impulse, and said means upon return to its preceding position applying the acquired charge of said capacitor to said measuring instrument and closing said motor control contacts.

5. A receiver for a telemetering system comprising a capacitor, means for charging said capacitor at a controlled rate, a measuring instrument, and relay-actuated contact means operably responsive to an applied electrical impulse and adapted upon completion of part of its operation from one to the other of its positions to complete a shorting connection across said capacitor, thereby to discharge said capacitor, and adapted upon completion of the remaining part of said operation from one to the other of its positions to open said shorting connection and to connect said capacitor to said charging means for charging to a potential difference representative of the length of said applied electrical impulse, said means upon return to its preceding position applying the acquired charge of said capacitor to said measuring instrument and preparing the shorting connection for another shorting of said capacitor.

6. A receiver for a telemetering system comprising a capacitor, means for charging said capacitor at a controlled rate, a measuring instrument, first relay-actuated contact means operably responsive to an applied electrical impulse and adapted upon operation from one to the other of its positions to complete a shorting connection across said capacitor, thereby to discharge said capacitor, to open said shorting connection, and to connect said capacitor to said charging means for charging to a potential difference related to the length of said applied electrical impulse, said means upon return to its preceding position disconnecting said capacitor from said charging means and applying its acquired charge to said measuring instrument, and second relay-actuated contact means operable with delayed response to the initiation and termination of said applied electrical impulse and adapted upon operation from one to the other of its positions to open said shorting connection after it is opened by said first contact means, and adapted upon return to its preceding position to close contacts in the shorting circuit after said first contact means have disconnected said capacitor from said charging means.

7. A receiver for a telemetering system comprising a capacitor, means for charging said capacitor at a controlled rate, a measuring instrument, and relay-actuated contact means operable from a first position to a second position in response to an applied electrical impulse and drag means associated with one of the movable contacts thereof to delay its movement with respect to each operation of said contact means, circuit connections under the control of said contact means for completing a discharge circuit for said capacitor upon movement from said first position and in said second position completing a charging circuit for said capacitor to acquire a charge related to the length of said applied electrical impulse, said contact means upon return to its said first position applying the acquired charge of said capacitor to said measuring instrument, said one of said movable contacts operating with said delayed response to open a connection in said discharge circuit after the discharge of said capacitor and operating with said delayed response to close a connection in said discharge circuit after application of the charge of said capacitor to said measuring instrument.

8. A telemetering system comprising a capacitor, a source of voltage in circuit with said capacitor for charging it to a potential difference related to the magnitude of a condition to be measured, means for discharging said capacitor, a measuring instrument, circuit-controlling means operable from a first circuit-controlling position to a second circuit-controlling position and then to said first position in response respectively to and solely by the initiation and termination of an applied electrical impulse for first discharging said capacitor, then connecting it to said source of voltage to acquire a charge related to the length of said applied electrical impulse, and upon return to its preceding position applying the acquired charge to said measuring instrument, and a transmitter for producing a succession of said impulses with a uniform time-space between each of them of duration greater than that required for operation of said circuit-controlling means.

9. A measuring system comprising a source of electrical impulses of duration proportional to the magnitude of a condition, electrostatic storage means, means for charging said electrostatic storage means at a controlled rate, an electrical instrument having in circuit therewith a variable source of voltage and having means for adjusting said voltage to equal a voltage applied to said instrument, and circuit connections including relay-actuated contact means operable in response to one of said pulses for discharging said storage means, for connecting said storage means to said charging means for a period representative of the length of said telemetering pulse to produce a voltage on said storage means representative of the length of said telemetering pulse, said contact means upon termination of said impulse disconnecting said storage means from said charging means, and connecting it to said instrument.

10. A system for measuring the magnitude of a condition comprising a source of known voltage, first electrostatic means, second electrostatic means, contact means in circuit with said first electrostatic means for intermittently first short-circuiting said first electrostatic means, then connecting it to said source of voltage for acquirement of a charge which produces a potential difference across said first electrostatic means of a magnitude representative of the magnitude of said condition, then disconnecting said first electrostatic means from said source of voltage, and for connecting said first electrostatic means to said second electrostatic means during intervals between connection thereof to said source of voltage to share its static charge with said second electrostatic means, and an electrical instrument including said source of known voltage connected in circuit with said second electrostatic means for comparing the potential difference on said second electrostatic means with a fractional part of said source of known voltage said instrument including means for adjusting said fractional part of said known voltage until substantially equal in magnitude to said potential difference of said second electrostatic means.

11. A receiver for a telemetering system comprising a capacitor, means for charging said capacitor at a controlled rate, a measuring instrument, circuit-closing means operably responsive to an applied electrical impulse and adapted upon application thereto of said impulse for (1) closing a shorting circuit across said capacitor thereby to discharge it, (2) opening said shorting circuit, (3) closing a charging circuit between said capacitor and said charging means, (4) opening said charging circuit upon termination of said impulse to leave on said capacitor a charge producing a potential difference related in magnitude to the length of said impulse, and (5) connecting said capacitor to said measuring instrument, and means associated with said circuit-closing means and operable concurrently therewith for preventing closure of said shorting circuit until after said connection of said capacitor to said measuring instrument.

12. The combination set forth in claim 11 in which said measuring instrument includes a null-type balancing circuit having an adjustable circuit-balancing component, a motor for driving said adjustable component, and an energizing circuit for said motor opened by said circuit-closing means during the time said capacitor is disconnected from said instrument and for closing said motor circuit upon connection of said capacitor to said instrument.

13. The combination set forth in claim 12 in which a second capacitor is connected to shunt with said measuring instrument to maintain thereon the potential difference of said first-named capacitor until it is changed by changing duration of electrical impulses actuating said circuit-closing means.

14. A receiver for a telemetering system comprising a capacitor, means for charging said capacitor at a controlled rate, a measuring instrument, circuit-opening and closing means having cooperating movable and stationary contact structures, actuating means responsive to an applied electrical impulse for moving said circuit means from one circuit-controlling position to a second circuit-controlling position, circuit connections between said contact structures, said capacitor and said measuring instrument for (1) closing a shorting circuit across said capacitor, thereby to discharge it during movement of said circuit means from said one position to said second position, (2) opening said shorting circuit, (3) closing a charging circuit between said capacitor and said charging means with said circuit means in its said second position, (4) upon termination of said impulse and movement of said circuit means towards its first position opening said charging circuit to leave on said capacitor a charge producing a potential difference related in magnitude to the length of said impulse, and (5) connecting said capacitor to said measuring instrument without diminution of its charge by closure of said shorting circuit for measurement of the potential difference on said capacitor by said measuring instrument.

15. The combination set forth in claim 14 in which one of said movable contact structures is included in said shorting circuit and is movable to open said shorting circuit with said circuit means in said second position and which is movable partially to re-close said shorting circuit after movement of said circuit means from said second position to said first position.

16. The combination set forth in claim 15 in which said measuring instrument includes a null-type balancing circuit having an adjustable circuit-balancing component, a motor for driving said adjustable component, and said circuit means having additional contact structure for opening said motor circuit during the time said capacitor is disconnected from said measuring instrument.

References Cited in the file of this patent

UNITED STATES PATENTS

| | | |
|---|---|---|
| 2,009,459 | Turner, Jr. | July 30, 1935 |
| 2,120,971 | Bailey | June 21, 1938 |
| 2,207,744 | Larson | July 16, 1940 |
| 2,336,929 | Doyle | Dec. 14, 1943 |
| 2,437,242 | Cole et al. | Mar. 9, 1948 |
| 2,441,226 | Phillips et al. | May 11, 1948 |
| 2,509,215 | Craig et al. | May 30, 1950 |
| 2,537,569 | Ballard | Jan. 9, 1951 |